Dec. 25, 1956  J. K. McDUFFEE  2,775,068
METAL TO GLASS SEALING FIXTURE
Filed March 22, 1954
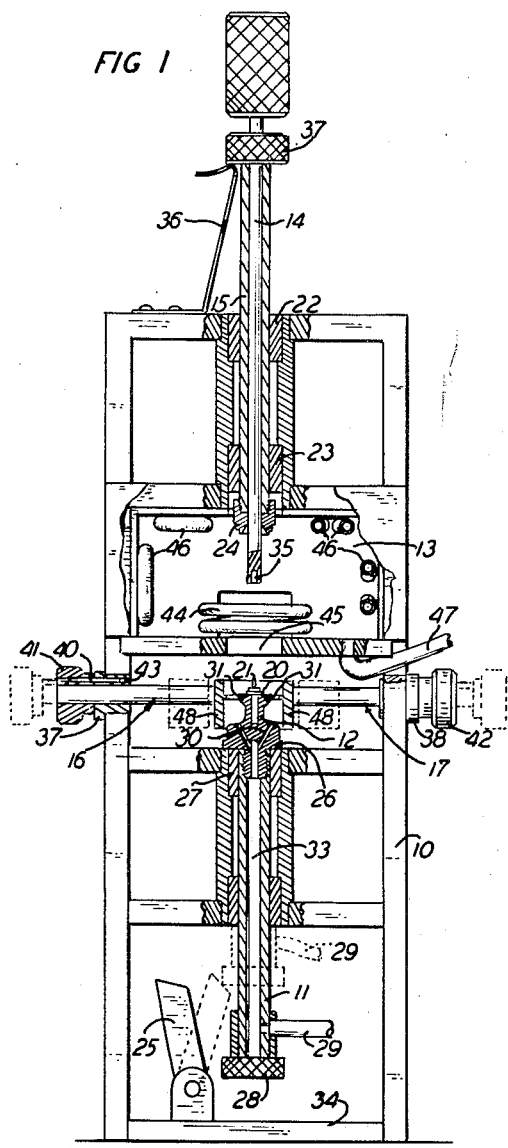
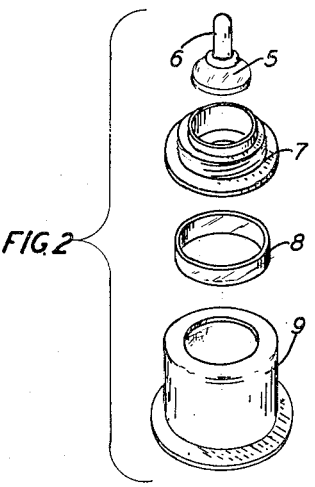
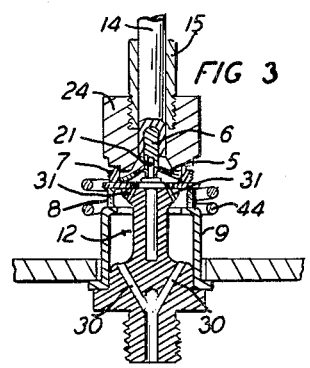
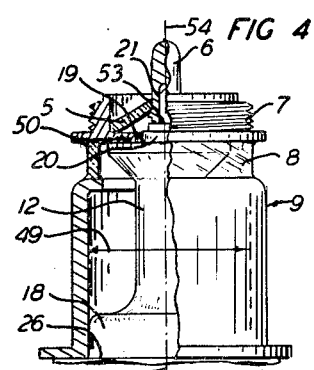
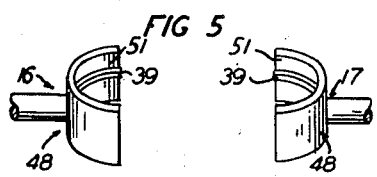
INVENTOR
J. K. McDUFFEE
BY W. C. Parnell
ATTORNEY United States Patent Office 2,775,068
Patented Dec. 25, 1956

2,775,068
METAL TO GLASS SEALING FIXTURE

John K. McDuffee, Kutztown, Pa., assignor to Western Electric Company, Incorporated, New York, N. Y., a corporation of New York Application March 22, 1954, Serial No. 417,685

5 Claims. (Cl. 49—1)

This invention relates to apparatus for sealing glass to metal and particularly to a fixture for accurately positioning and fusing together a plurality of glass and metal parts.

In the manufacture of electron discharge devices currently employed in high frequency communication apparatus, it is essential that the various metal and glass parts thereof be accurately assembled and fused since, due to the very short wave length of the frequencies involved, any slight misalignment of parts or electrodes supported by the parts may make the devices inoperative.

It is therefore, the prinicipal object of this invention to facilitate the fabrication of such devices while insuring accurate spacial relationship between the parts.

In accordance with the general features of the invention, a mandrel is provided which is movable between a loading position, where it may be loaded with the glass and metal parts, and a heating position in a chamber where the parts are fused. Means are provided for concentrically aligning the parts at the loading position and at least one contoured forming tool on a movable rod is utilized to apply pressure to the assembled parts to compress them to predetermined spacial relationship along the mandrel when the parts are heated within the field of an induction coil provided in the chamber.

According to an important feature of the invention, the mandrel is hollow and gas under pressure is applied thereto, to produce an internal pressure to the assembled parts to prevent the glass seals from shrinking inwardly as the glass becomes plastic.

Other features of the invention will be more fully understood from the following detailed description taken in conjunction with the accompanying drawings, in which:

Fig. 1 is a front, partially broken, elevational view of a fixture according to the invention;

Fig. 2 is an exploded view of the metal and glass parts of a vacuum tube that are fused together by the fixture shown in Fig. 1;

Fig. 3 is a detailed view of the parts to be fused positioned in heating position in the fixture;

Fig. 4 is a partially broken view showing the details of the parts receiving member of the mandrel with a fused bulb assembly mounted thereon, and Fig. 5 is an isometric view of the parts locating members of the fixture.

Referring now to the drawing, the fixture shown is designed for fabricating the bulb assembly of a Western Electric Co. type 416A triode vacuum tube, designed for high frequency use, which is similar to that disclosed in Patent 2,527,127 issued October 24, 1950, to R. S. Gormley, C. Maggs and L. F. Moose. This bulb assembly comprises a pre-fused anode terminal seal assembly which includes the glass support seal 5 and the metal anode terminal 6, a metal grid terminal ring 7, a glass ring 8 and a metal bulb 9.

As seen in Fig. 1, a main support structure 10 is provided for a closed oven 13, a lower, vertically slidable mandrel 11, two upper, vertically slidable rods 14 and 15 and two horizontally slidable locating members 16 and 17. The mandrel 11 has a contoured parts receiving member 12 attached to its upper end which is provided with parallel, annular plane surfaces 53, 19 and 26 (Fig. 4) in accurate spacial relationship for precisely locating the anode terminal 6, grid terminal ring 7 and bulb 9 respectively, along the vertical axis 54—54 of the member 12 when the assembled parts are compressed thereon while fusing. Concentric, cylindrical portions 21, 20 and 18, having diameters slightly less than an internal, axial hole in the anode terminal 6, annular ring 50 of the grid terminal ring 7 and the internal diameter 49 of the bulb respectively, insure proper co-axial alignment of the parts. The glass ring 8 is aligned co-axially by the rib 39 of locating member 48 (Fig. 5) while in loading position. This will be more fully described in the operation of the device which is discussed below.

The mandrel 11 is movable so that it may occupy a loading position, as shown, where the lower portion of member 12 is supported on fixed sleeve 27 for the mandrel or the mandrel may be raised to a heating position where the upper portion of member 12 is inserted into the oven 13. A locking member 25, pivotally mounted to the base 34 of the main structure 10, is provided for engaging a lower end member 28 to lock the mandrel 11 in the raised position as shown by the dotted lines in Fig. 1 where the bulb assembly will occupy the position shown in Fig. 3. An axial hole 33 in the mandrel 11 is provided for applying gas, under pressure, from a source not shown, through tube 29 to holes 30 in member 12. This is provided for blowing the glass seals and will be described more fully below.

Rod 14 is slip fitted in a central axial hole provided in rod 15, an anode terminal receiving hole 35 being provided in the lower end of rod 14. Rod 15, which is slip fitted in fixed sleeves or bearings 22 and 23, has a contoured grid terminal ring contacting member 24 for engaging the top flange of the grid terminal ring 7. A spring stop member 36, mounted to the top of the main structure 10, is adapted to engage annular weight member 37 fixed to the top of rod 14 to secure the rod in a normally raised position.

Locating members 16 and 17 are slidably mounted in fixed sleeves 37 and 38 respectively and are provided with split centering clamps 48 for aligning the various parts assembled on the mandrel member 12. A raised semi-annular ridge 39 is provided on the inner semi-cylindrical surface of the clamps 48 for concentrically positioning the glass ring 8 with respect to the other parts. The members 16 and 17 are prevented from twisting out of proper orientation by dowel pins 40 which are mounted in handles 41 and 42 and which slide in holes 43 in the fixed sleeves 37 and 38.

The oven 13 is a closed box having an induction heating coil 44 mounted therein for heating the parts when mandrel 11 is in its raised position, a hole 45 being provided in the bottom panel of the oven to allow the mandrel member 12 to pass therein. An opening is also provided in the top of the oven through which rods 14 and 15 may be moved. Water cooling coils 46 are mounted on the walls of the oven to prevent distortion of the fixture through overheating.

Operation

By removing the locking member 25 from engagement with the mandrel end member 28, the mandrel will, of its own weight, drop to loading position as shown in Fig. 1. In this position, the parts are placed on the mandrel member 12 in the following order: first, the oxidized metal bulb 9, the lower flange of which will rest on the flat annular surface 26, then the glass ring 8, the oxidized metal grid terminal ring 7 and finally the pre-fused anode terminal seal assembly is placed on the cylindrical pin 21 so that the pin is in the hole of the anode terminal.

Once the parts have been assembled on the mandrel member 12, the locating members 16 and 17 are moved to concentrically align the assembled parts between the split clamps 48 and are then withdrawn. In this operation, the glass ring 8 is aligned, by annular ridge 39, with the bulb 9 which is held in proper position on the member 12 and, if grid ring 7 has not been properly positioned with respect to annular support 19 of member 12, it is aligned concentrically by the cylindrical surface 51 of the locating members 48. The parts are now ready to be moved into the oven for fusing. The rods 14 and 15 are raised and the mandrel 11 is raised and locked in position by pivoting member 25 (dotted lines in Fig. 1). The rod 14 is then lowered so that the anode 6 enters the hole 35 provided therefor. The rod 14 is allowed to rest of its own weight in this position, the rod 15 at this time still being held in its raised position by the locking spring 36. The rod 14 is not forced into position but will move there automatically as the parts are heated when the weight of the rod will force the plastic glass seal 5 into sealing engagement with the grid ring 7. An atmosphere of nitrogen, or another inert gas is provided in the oven to prevent oxidation of the parts as they are heated, the nitrogen being supplied thereto through the tube 47. The parts are now ready to be fused and the induction heating coil 44 is energized. The associated apparatus for the coil 44 is not shown as it is of conventional design and well known in the art.

In order to prevent the glass seals from shrinking inwardly as the glass becomes plastic, pressure is applied from time to time to the inside of the bulb assembly by applying nitrogen, or another inert gas, thereto through the tube 29, the hole 33 in the mandrel and the holes 30 in the member 12. This gas pressure is also applied to the underside of the anode glass seal 5 through the venting holes 31 in the top of member 12. The internal application of nitrogen in this manner also helps to prevent oxidation of the heated parts in case any air has been trapped therein. Observation of the seal formation will determine just how much blowing is necessary. A glass window may be provided in the oven to allow such observation.

As the fusing takes place, weighted rod 14 will cause the anode to settle on pin 21 to surface 53 forcing the plasticized glass anode seal to the grid ring 7. Surface 53 limits the downward travel of the anode terminal 6 on pin 21 so that it will be in proper spacial relation with the bulb 9 resting on surface 26. At the end of the fusing period, the heating coil is de-energized and the spring locking member 36 for the rod 15 is removed from member 37 to allow the member 24 to be lowered on the grid terminal ring 7 and pressure applied thereto to insure its proper positioning on surface 19 of the mandrel member 12 while forcing the now plastic glass ring 8 into sealing engagement with the grid ring 7 and the bulb 9. This accurately locates the grid terminal ring 7 in spacial relationship with the anode terminal 6 and the bulb 9. The rod 15 is thereupon restored to its upper locked position, the bulb is allowed to cool for about 30 seconds until it loses its visible red color and the mandrel 11 is lowered to the loading position where the fused bulb assembly may be removed from the mandrel member 12.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a fixture for fusing a plurality of glass and metal parts together in accurately predetermined positions, a mandrel for receiving the parts mounted for movement between a loading and a heating position, said mandrel having parallel, annular plane surfaces therealong, means at the loading position for concentrically locating the parts on the mandrel, a chamber having an induction heating coil surrounding the parts when the mandrel is in the heating position and at least one rod extending down into the chamber having a contoured member mounted on the lower end thereof for applying pressure to the parts to properly locate the parts on the annular surfaces along the mandrel.

2. In a fixture for fusing a plurality of glass and metal parts together in accurately predetermined positions, a mandrel for receiving the parts mounted for movement between a loading and a heating position, said mandrel having parallel, annular plane surfaces therealong, means at the loading position for concentrically locating the parts on the mandrel, a chamber having an induction heating coil surrounding the parts when the mandrel is in the heating position, at least one rod extending down into the chamber having a contoured member mounted on the lower end thereof for applying pressure to the parts to properly locate the parts on the annular surfaces along the mandrel and means for applying pressure to the internal faces of the parts to prevent the glass seals from shrinking inwardly.

3. In a fixture for fusing a plurality of glass and metal parts together in accurately predetermined positions to form an open cavity construction, a hollow mandrel mounted for movement between a loading and a heating position, a contoured member, having a plurality of parallel, annular plane surfaces, for receiving the parts mounted on the top end of the mandrel and having at least one hole therein connected to the hole in the mandrel, means at the loading position for concentrically locating the parts on the mandrel, a chamber having an induction heating coil surrounding the parts when the mandrel is in the heating position, means for introducing an inert atmosphere into the chamber, at least one weighted rod extending down into the chamber, a contoured member mounted on the lower end of the rod for subjecting the parts to a predetermined pressure to locate the parts on the annular surfaces and means for introducing an inert gas under pressure into the hole in the mandrel for blowing the glass seals by applying pressure to the inside of the cavity formed by the assembled parts.

4. In a fixture for fusing a plurality of glass and metal parts together in accurately predetermined positions to form an open cavity construction, a hollow mandrel mounted for movement between a loading and a heating position, means on the mandrel for receiving the parts, means at the loading position for concentrically locating the parts on the mandrel, said mandrel having a plurality of parallel, annular plane surfaces, a chamber having an induction heating coil surrounding the parts when the mandrel is in the heating position, means for introducing an inert atmosphere into the chamber, a weighted rod extending down into the chamber, a contoured member mounted on the lower end of the rod for subjecting the parts to a predetermined compressive force to position the parts on the annular surfaces predetermined spacial relationship along the mandrel, and means for introducing an inert gas under pressure into the hole in the mandrel for blowing the glass seals by applying pressure to the inside of the cavity formed by the assembled parts.

5. In a fixture for fusing a plurality of glass and metal parts together in accurately predetermined positions to form an open cavity construction, a hollow mandrel mounted for movement between a loading and a heating position, a member for receiving the parts mounted on the top end of the mandrel and having at least one hole therein connected to the hole in the mandrel, means on the parts receiving member for locating the parts in accurate spacial relationship therealong, reciprocable split sleeve means at the loading position for locating the parts concentrically on the said member, a chamber having an induction heating coil surrounding the parts when the mandrel is in the heating position, means for introducing an inert atmosphere into the chamber, at least one rod extending down into the chamber having a contoured, parts contacting end for subjecting the parts to compressive pressure to position them on the respective parts locating means along the parts receiving means, and means for introducing an inert gas under pressure into the hole in the mandrel for blowing the glass seals to prevent them from shrinking inwardly.

References Cited in the file of this patent

UNITED STATES PATENTS

| | | |
|---|---|---|
| 2,271,658 | Miller | Feb. 3, 1942 |
| 2,494,870 | Greiner | Jan. 17, 1950 |
| 2,511,914 | Haas | June 20, 1950 |
| 2,551,402 | Vinson | May 1, 1951 |
| 2,553,749 | Clark et al. | May 22, 1951 |
| 2,575,448 | Haas | Nov. 20, 1951 |